United States Patent
Judkins et al.

(10) Patent No.: US 10,236,690 B2
(45) Date of Patent: Mar. 19, 2019

(54) BACKFEED POWER SUPPLY FOR SOLAR POWER SYSTEM

(71) Applicant: SunPower Corporation, San Jose, CA (US)

(72) Inventors: Zachary Steele Judkins, Oakland, CA (US); Jacob Marshall, Fairfield, CA (US); Venkatesh Prasad Hanglur Narasimha, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 263 days.

(21) Appl. No.: 15/199,127

(22) Filed: Jun. 30, 2016

(65) Prior Publication Data
US 2018/0006464 A1 Jan. 4, 2018

(51) Int. Cl.
| | | |
|---|---|---|
| *H02J 1/00* | (2006.01) | |
| *H02J 3/00* | (2006.01) | |
| *H02J 3/38* | (2006.01) | |
| *H02S 40/32* | (2014.01) | |
| *H02S 40/38* | (2014.01) | |
| *H02J 3/46* | (2006.01) | |

(52) U.S. Cl.
CPC .............. *H02J 3/385* (2013.01); *H02J 3/383* (2013.01); *H02J 3/46* (2013.01); *H02S 40/32* (2014.12); *H02S 40/38* (2014.12)

(58) Field of Classification Search
CPC .. H02J 3/385; H02J 3/46; H02S 40/32; H02S 40/38
See application file for complete search history.

(56) References Cited

U.S. PATENT DOCUMENTS

| | | |
|---|---|---|
| 7,958,886 B2 | 6/2011 | Barsun et al. |
| 8,101,849 B2 | 1/2012 | Almy et al. |
| 8,484,434 B2 | 7/2013 | Caprioli |
| 9,353,970 B2 | 5/2016 | Linderman |
| 2010/0302819 A1 | 12/2010 | O'Brien et al. |
| 2011/0303213 A1 | 12/2011 | Kraft |
| 2012/0216852 A1 | 8/2012 | Almy et al. |
| 2013/0200702 A1 | 8/2013 | Schoppner |
| 2014/0070619 A1 | 3/2014 | Fornage |
| 2014/0211529 A1 | 7/2014 | Kandasamy et al. |
| 2016/0079914 A1 | 3/2016 | Wu |
| 2017/0093329 A1 | 3/2017 | Jensen |
| 2017/0187192 A1* | 6/2017 | Jeanty ................ H02M 7/44 |
| 2018/0026550 A1* | 1/2018 | Dent .................. H02J 3/383 |
| | | 363/56.01 |

FOREIGN PATENT DOCUMENTS

WO    WO2014192014 A2    12/2014

* cited by examiner

*Primary Examiner* — Carlos D Amaya
(74) *Attorney, Agent, or Firm* — Grasso PLLC

(57) ABSTRACT

A solar collection system may collect energy from the sun to generate electricity for distribution on an electrical grid. In addition to generating electricity, a solar collection system may include support devices such as motors, controllers, sensors, and other support devices to perform various tasks to allow the solar collection system to more effectively generate electricity. When the solar collection system is generating sufficient power, the support devices may be powered by the solar collection system. However, when the solar collection system is not generating sufficient power, the support devices may be powered by a backfeed power supply circuit coupled to the electrical grid.

20 Claims, 9 Drawing Sheets

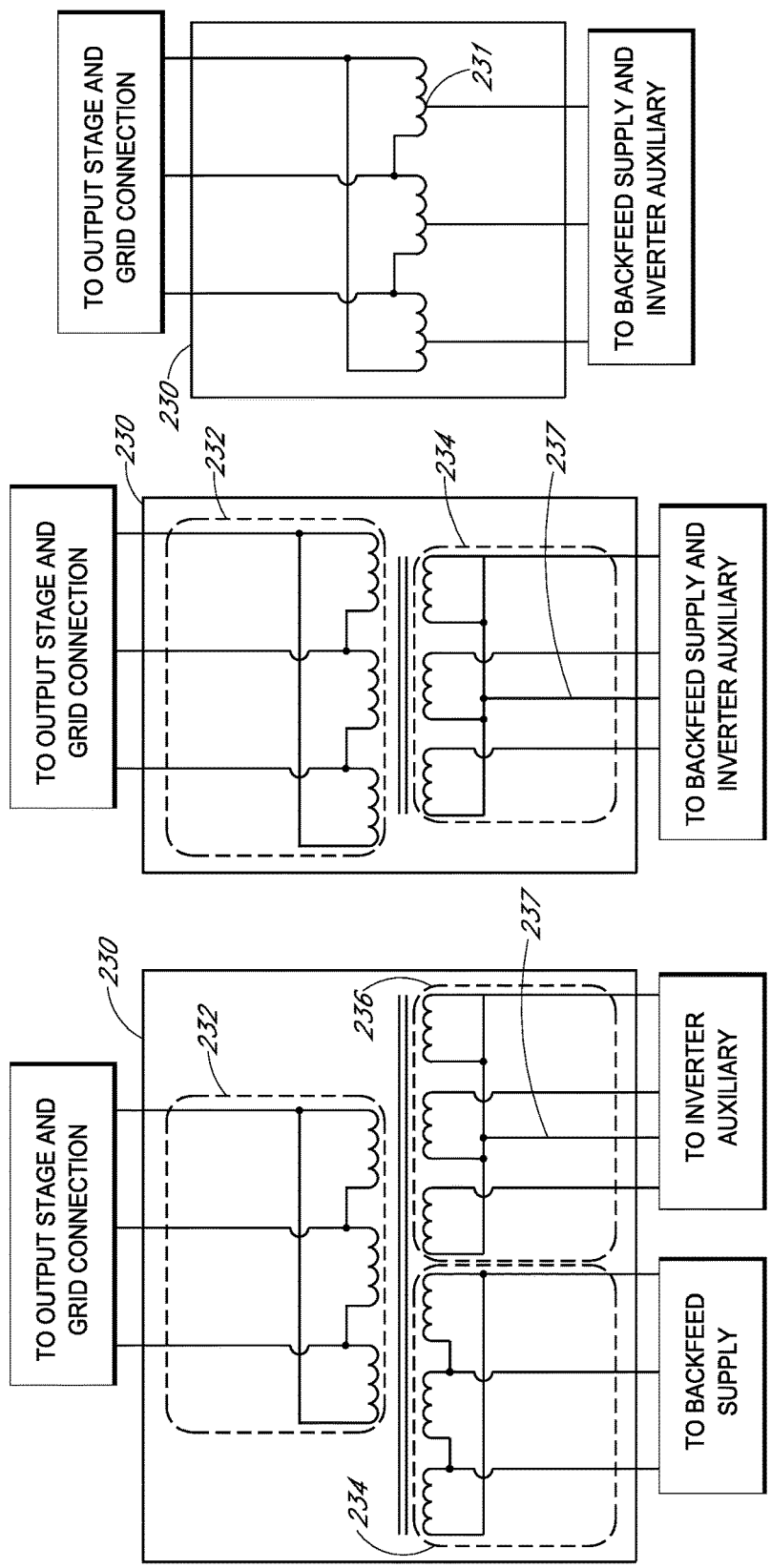

BACKFEED POWER SUPPLY FOR SOLAR POWER SYSTEM

BACKGROUND

Larger solar collector installations usually include an array of solar collector devices. Such systems can be used in conjunction with photovoltaic modules, thermal solar collector devices as well as concentrators for concentrating solar energy onto photovoltaic devices or thermal solar collection devices.

Some of these solar collector systems include hardware for automatically adjusting the position of the collector devices to track the sun as it moves across the sky. This tracking movement can be accomplished in a number of different ways. Some systems use a single axis tracking system in which the collector devices pivot about a single axis. Such single axis type tracking systems often include a drive shaft or "torque tube" which defines a single pivot axis. A solar collector system may also include a number of support devices such as motors, controllers, and sensors to perform various support tasks to support or control the solar collector system.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 2E-2G are circuit diagrams of transformers in accordance with various disclosed embodiments;

SUMMARY

Figure 1:
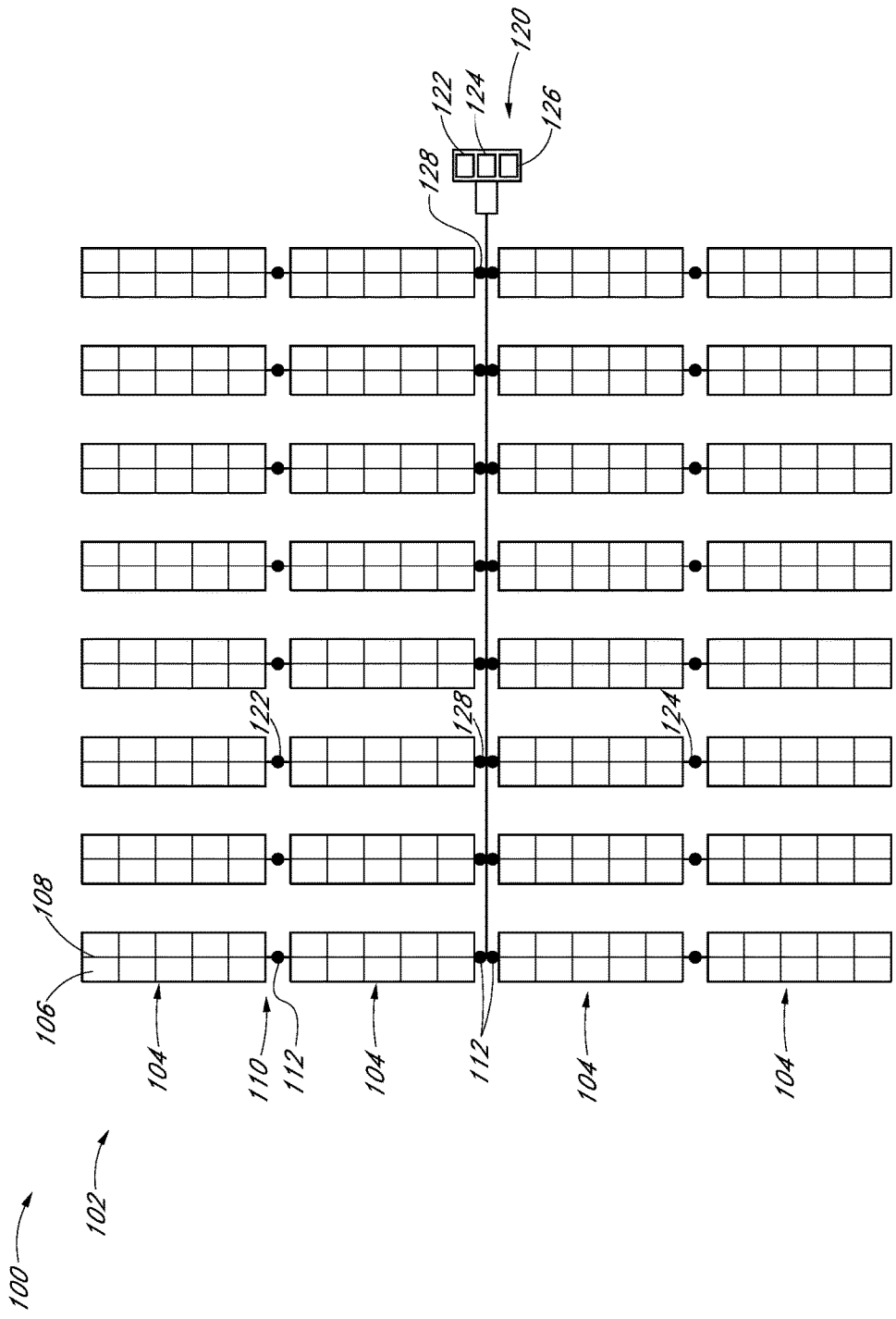
FIG. 1 is a schematic top plan view of a solar collector system.

Embodiments may include a solar power system coupled to an AC power grid comprising: a solar collection system; an inverter having an input terminal coupled to the solar collection system and an output terminal coupled to the AC power grid; a backfeed power supply coupled to the solar collection system and the input terminal of the inverter wherein the backfeed power supply is configured to not provide power from the AC power grid to the solar collection system during a first time period and to provide power from the AC power grid to the solar collection system during a second time period.

Embodiments may also include a method for operating a solar power system including a solar collection system and coupled to a power grid, the method comprising: measuring a DC voltage of the solar collection system, determining whether the DC voltage is below a threshold value; when the DC voltage is below the threshold, providing power from the power grid to the solar collection system; and when the DC voltage is above the threshold, not providing power from the power grid to the solar collection system.

Embodiments may further include a solar power system coupled to an AC power grid comprising: a solar collection system adapted to output DC power at a DC voltage; an inverter having an input terminal coupled to the solar collection system and an output terminal coupled to the AC power grid, the inverter including: one or more input controlled switches, an output stage, an inverter controller, a transformer having a first winding coupled to the output terminal and a second winding; a backfeed power supply coupled to the solar collection system, the input terminal, and the second winding of the transformer, the backfeed power supply including: an AC-DC converter, and one or more backfeed controlled switches; wherein the inverter controller is adapted to: receive the DC voltage, determine whether the DC voltage is below a threshold value, if the DC voltage is below the threshold value, deactivate the one or more input controlled switches and activate the one or more backfeed controlled switches, and if the DC voltage is above the threshold value, activate the one or more input controlled switches and deactivate the backfeed controlled switches, wherein the solar collection system receives power from the AC power grid when the one or more backfeed controlled switches are activated.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

FIG. 1 illustrates the solar collection system 100 (also referred to as the system 100 herein) including a solar collector array 102 which includes a plurality of solar collection modules 104. Each of the solar collection modules 104 can include a plurality of solar collecting devices 106 supported by a drive shaft or torque tube 108. Each of the torque tubes 108 are supported above the ground by a support assembly 110. Each of the support assemblies 110 can include a pile and a bearing assembly 112.

With continued reference to FIG. 1, the system 100 can also include a tracking drive 120 connected to the torque tube 108 and configured to pivot the torque tube 108 so as to cause the collector devices 106 to track the movement of the sun. The system 100 may include one or more support devices (e.g., one or more electric motors 122, one or more controllers 124, one or more sensors 126, and/or other support devices 128. The one or more motors 122 may be electric motors. The controller 124 may be a computing device having one or more processors and a tangible memory storing executable instructions that when executed by the one or more processors cause the controller to implement one or more support tasks (e.g., controlling one or more motors 122, receiving data from one or more sensors 126, etc.). The one or more sensors 126 may include mechanical sensors (e.g., sensors to measure the relative position of the torque tubes 108, seismographs, etc.), electrical sensors (e.g., sensors to measure the voltage, current, and/or power flowing through the system 100), visual sensors (e.g., cameras). The other support devices may include one or more lights; one or more cleaning robots to clean, repair, or otherwise maintain the system 100; one or more communications or networking devices to connect the system 100 to another system 100, a LAN, a WAN, and/or the internet; a drone controller to operate a drone observing the system 100. It will be understood that one or more motors 122, controllers 124, sensors 126, and/or other support devices 128 may be coupled to system 100 in any of a number of locations (e.g., at the tracking drive 120, at various places on the array 102) to perform one or more support tasks as discussed herein.

In the illustrated embodiment, the torque tubes 108 are arranged generally horizontally and the modules 104 are connected to each other in an end to end arrangement. However, inventions disclosed herein can be used in the context of other types of arrangements. For example, the system 100 can include a plurality of modules 104 that are arranged such that the torque tube 108 is inclined relative to horizontal, wherein the torque tubes 108 are not connected in an end to end fashion, such as the arrangement illustrated and disclosed in U.S. Pat. No. 8,101,849, which is hereby expressly incorporated by reference in its entirety for all purposes.

The drive system 120 may be constructed and operated in the manner disclosed with regard to the tilt assembly 50 of U.S. Pat. No. 7,958,886. The entire contents of U.S. Pat. No. 7,958,886 is hereby expressly incorporated by reference for all purposes.

Additionally, the solar collection devices 106 can be in the form of photovoltaic ("PV") panels, thermal solar collection devices, concentrated photovoltaic devices, or concentrated thermal solar collection devices. In the illustrated embodiment, the solar collection devices 106 are in the form of photovoltaic panels.

Figure 2A:
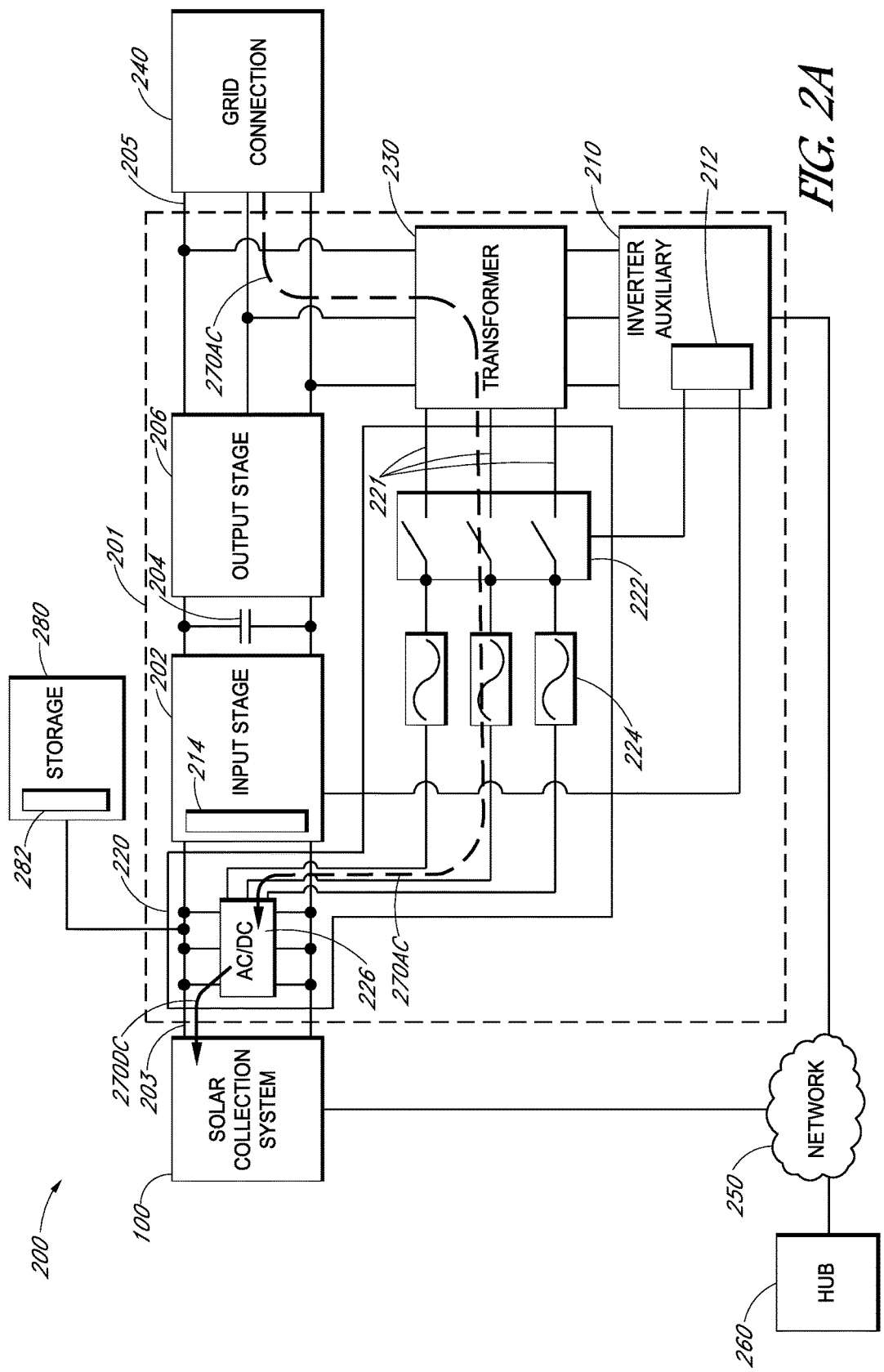
FIG. 2A is a block diagram of a solar power system in accordance with various disclosed embodiments.

Referring now to FIG. 2A, a block diagram showing various components of a solar power system 200 is shown.

A solar collection system 100 may be electrically coupled to an inverter 201 by one or more input terminals 203. While two input terminals 203 are shown in FIG. 2A, it will be understood that the inverter 201 may have more than two input terminals 203. The inverter 201 may be electrically coupled to a grid connection 240 by one or more output terminals 205. While three output terminals 205 are shown in FIG. 2A, it will be understood that the inverter 201 may have more or fewer output terminals 205. The solar collection system 100 and inverter 201 may also be coupled to a network 250. Additionally, a hub 260 may be communicatively coupled to the network 250 and may communicate with the solar collection system 100 and the one or more inverter controllers 212 discussed herein. Additionally or alternatively, the inverter 201 may be connected to energy storage device 280.

The inverter 201 may include an input stage 202, a DC bus capacitor 204, and an output stage 206. The inverter 201 may also include a transformer 230 and an inverter auxiliary 210. The inverter 201 may also include a backfeed electrical connection 220. In addition to the other functions and techniques described herein, it will also be understood that the inverter 201 (e.g., using the one or more inverter controllers 212) may also control (or help the controllers 124 control) the solar collection system 100 to implement known optimization techniques such as maximum power point tracking ("MPPT").

The input stage 202 may be coupled to the one or more input terminals 203 of the inverter 201. The input stage 202 may include any of a number of known passive and active electrical components. Such components may include inductors, capacitors, resistors, transistors, etc. The input stage 202 may electrically filter and smooth out electrical input to the inverter 201 from the solar collection system 100. Alternatively, or additionally, the input stage 202 may increase or decrease the voltage of the electrical input to the inverter 201 from the solar collection system 100. The input stage 202 may also include one or more controlled switches 214. The one or more controlled switches 214 (also referred to herein as "input controlled switches") may be used to disconnect the solar collection system 100 from the DC bus capacitor 204 and output stage 206 and thereby prevent electricity from the solar collection system 100 from being pushed to the grid connection 240. The controlled switch 214 may be coupled to and controlled by the inverter controller 212 as discussed herein. The inverter controller 212 may cause the one or more controlled switches 214 to be closed when the voltage across the solar collection system 100 is above a threshold value (e.g., 300 volts, although the threshold value may be greater or less than 300 volts) and to be open when the voltage across the solar collection system 100 is below the threshold value as discussed herein.

The DC bus capacitor 204 may be used to regulate the DC voltage inside the inverter 201. Accordingly, the DC bus capacitor 204 may ameliorate the effect of an instantaneous change in voltage across the solar collection system 100 (e.g., a sudden decrease in voltage resulting from a cloud suddenly appearing over the solar collection system 100, a sudden increase in voltage resulting from clouds disappearing, etc.). Accordingly, the input stage 202 and DC bus capacitor 204 may be used to regulate the electrical input to the output stage 206. Additionally, when the input controlled switches 214 are OFF and current is not flowing from the solar collection system 100 to the grid connection 240, the DC bus capacitor 204 may provide reactive power to the AC power grid according to known techniques.

The output stage 206 may be coupled to the one or more output terminals 205 of the inverter 201. The output stage 206 may be any of a number of known DC to AC conversion topologies. The output stage 206 may use a multistage DC to AC conversion topology. The output stage 206 may output AC power to the grid connection 240 via the output terminals 205 of the inverter 201. The output stage 206 may produce single phase AC power or multi-phase AC power (i.e., three phase AC power, split phase AC power). In the embodiment shown in FIG. 2A, the output stage 206 generates three phase AC power at the rated voltage of the inverter 201 and the requirements of the grid connection 240 at 50 or 60 Hz based on the requirements of the regional power grid.

The transformer 230 is coupled to the output stage 206 and grid connection 240, the backfeed power supply 220, and the inverter auxiliary 210. As discussed in connection to FIGS. 2E-2G and 2I herein, the transformer 230 may be any of a number of transformer topologies (e.g., a three winding transformer, a two winding transformer, a non-isolated transformer, a four winding transformer, etc.). The transformer 230 may convert AC power from the output stage 206 and/or the grid connection 240 (e.g., about 500 to 700 volts, although other voltage ranges could be used) to a lower voltage AC power (e.g., 120 to 212 volt AC power although other voltage ranges could be used). This lower voltage AC power may be more appropriate for powering the inverter auxiliary 210 and the backfeed power supply 220.

The inverter auxiliary 210 may include any of a number of devices providing control and/or support tasks in the inverter 201. For example, the inverter auxiliary 210 may include fans, lights, input devices, displays, and/or one or more inverter controllers 212. The one or more inverter controllers 212 may be used to control the various functions of the inverter 201 as discussed herein. For example, the one or more inverter controllers 212 may control the one or more controlled switches 214, the one or more controlled switches 222, and may communicate with solar collection system 100 over the network 250.

Figure 2C:
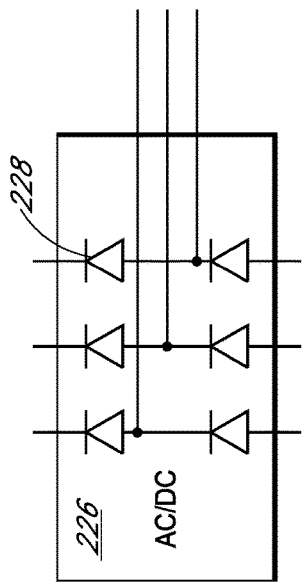
FIGS. 2C-2D are circuit diagrams of AC-DC converters in accordance with various disclosed embodiments.
Figure 2D:
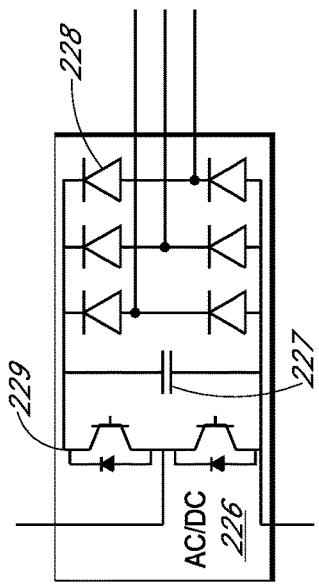

The backfeed power supply 220 may provide a current path for electrical power from the grid connection 240 to the solar collection system 100 discussed herein. While the backfeed power supply 220 in FIG. 2A is shown as being a component of the inverter 201, it will be understood that the backfeed power supply 220 may be a separate device from the inverter 201, built into the inverter 201, or a removable module (e.g., a printed circuit board coupled to an expansion slot of the inverter 201) of the inverter 201. The backfeed power supply 220 may include one or more parallel electrical paths 221 relating to the number of phases of AC power passing from the grid connection 240 through the transformer 230. For example, if the transformer 230 passes all three phases of three phase AC power from the grid connection 240, the backfeed power supply 220 may include three parallel electrical paths 221. Alternatively, as shown in FIGS. 2H and 2I, an inverter 201 including a 12 pulse full wave bridge rectifier and a four winding transformer 230 may include six parallel electrical paths 221. Each electrical path 221 may include a controlled switch 222 and a fuse 224. The controlled switches 222 (also referred to herein as "backfeed controlled switches") may be any of a number of electrically controllable switches such as relays, transistors, thyristors, contactors, controlled circuit breakers, etc. Arrow 270AC illustrates the flow of AC current from the grid connection 240, through the transformer 230, and through the backfeed power supply 220. Arrow 270DC illustrates the flow of DC current out of the AC-DC converter 226 of the backfeed power supply 220 into the solar collection system 100. It will be understood that the DC current illustrated by arrow 270DC may flow along the same circuitry used by the solar collection system 100 to push power generated by the solar collection system 100 to the inverter 201 and to the grid connection 240. Alternatively, or additionally, the DC current illustrated by arrow 270DC may flow along a separate circuit to the solar collection system 100. Such a separate circuit may be dedicated to receiving power from the backfeed power supply 220, or it may be used for additional purposes.

In addition to providing a current path for electrical power from the grid connection 240 to the solar collection system 100, the backfeed power supply 220 may also provide a path for power line communication (PLC) from the grid connection 240 (and/or the regional grid) to the solar collection system 100. PLC may be conducted according to known techniques using open and/or proprietary PLC protocols. PLC may be conducted by encoding data on the waveform of the AC power flowing from the grid connection 240 through the backfeed power supply 220 and decoding the data from the waveform of the power flowing from the grid connection 240 with one or more support devices (e.g., one or more controllers 124, one or more communications or networking devices) of the solar collection system 100.

The controlled switches 222 may receive input from the inverter controller 212. The inverter controller 212 may close the one or more controlled switches 222 and therefore allow current to flow through the electrical paths 221, and the inverter controller 212 may open the one or more controlled switches 222 and therefore prevent current flow through the electrical paths 221. A fuse 224 may be used to prevent excess current from flowing through an electrical path 221 and potentially damaging the AC-DC converter 226 or the solar collection system 100. Additionally, or alternatively, a circuit breaker may be used to prevent excess current from flowing through the electrical path 221.

The AC-DC converter 226 may be any of a number of active or passive topologies to convert AC power into DC power (e.g., a pulse rectifier, an active rectifier, etc.). The AC-DC converter is discussed in further detail in connection to FIGS. 2C, 2D, and 2H herein. Once the AC power from the grid connection 240 is converted into DC power by the AC-DC converter 226, the resulting DC power may be used to power various components of the solar collection system 100 as discussed herein. In some embodiments, the AC-DC converter 226 may convert AC power having voltage in a range of 120 to 212 volts into a DC waveform having a voltage in a range of 270 to 330 volts (e.g., a voltage close to the threshold value discussed herein, although other voltages could be used). As discussed herein, an active AC-DC converter 226 (e.g., the active AC-DC converter 226 of FIG. 2D) may be able to adjust the output voltage of the AC-DC converter 226 by adjusting the duty cycle of the AC-DC converter 226.

The grid connection 240 may be coupled to the one or more output terminals 205 of the inverter 201. The grid connection 240 may be any of a number of known interconnections between the output terminals 205 of the inverter 201 and a regional AC power grid. The grid connection 240 may be configured to receive AC power at a voltage and frequency determined by the requirements of the regional grid and its regulations. For example, the grid connection 240 may be configured to receive power at voltages between 120 volts and 480 volts at a frequency of 50 Hz or 60 Hz. The inverter 201 may be configured such that the power output of the inverter 201 matches the voltage and frequency of the grid connection 240.

The network 250 may be any of a number of wired (e.g., Ethernet) or wireless (e.g., 802.11 wireless networking) computer communications technologies. The network 250 may be a local area network, a proprietary network, a secure public internet, a virtual private network or some other type of network, such as dedicated access lines, plain ordinary telephone lines, satellite links, combinations of these, etc. Where the network 250 comprises the Internet, data communications may take place over the network 250 via an Internet communication protocol.

The hub 260 may be one or more computers or servers communicatively coupled to the network 250. The hub 260 may be located on the site of the solar collection system 100, or it may be remote. The hub 260 may be a single computer or server implementing a program to manage the solar collection system 100, inverter 201, and/or grid connection 240. Alternatively, the hub 260 may be implemented on a distributed computing platform or cloud. The hub 260 may automatically manage the solar collection system 100 (e.g., determining whether to adjust the position of the solar collection system 100 as discussed herein), inverter 201 (e.g., determining control parameters for the inverter 201), and/or grid connection 240. Additionally, or alternatively, the hub 260 may receive and implement commands from one or more human technicians.

The energy storage device 280 may be any of a number of known devices to store energy. The energy storage device 280 may include a DC-DC converter 282 to convert the DC voltage at the input terminal 203 to the appropriate voltage for the energy storage device 280. The energy storage device 280 may store energy as electrical energy in an array of one or more batteries (e.g., lithium ion batteries, lead acid batteries, etc.). Additionally, or alternatively, the energy storage device 280 may store energy as heat energy by heating a working fluid (e.g., water, ethylene glycol, molten salt, etc.). Additionally, or alternatively, the energy storage device 280 may store energy as potential energy (e.g., by pumping water into a water tower, by raising a weight, etc.).

It will be understood that the solar power system 200 may charge and discharge the energy storage device 280 for any of a number of reasons. For example, the energy storage device 280 may be charged with power generated by the solar collection system 100 during a first time period when the solar collection system 100 generating a first amount of power and discharged during a second time period when the solar collection system 100 is generating a second amount of power lower than the first. As another non-limiting example, the energy storage device 280 may be charged by the solar collection system 100 during a first time period when a regional grid management authority (e.g., an electrical utility company) is paying a first amount of money for electricity and discharged during a second time period when the regional grid management authority is paying a second amount of money that is greater than the first amount. As another non-limiting example, the energy storage device 280 may be charged by power flowing from the grid connection 240 through the backfeed power supply 220 as discussed herein during a first time period when a regional grid management authority is charging a first amount of money per kilowatt hour and discharged during a second time period when the regional grid management authority is paying a second amount of money per kilowatt hour that is higher than the first amount of money. As another non-limiting example, the energy storage device 280 may be used to supply DC power to the solar collection system 100 (e.g., in the event of an outage in the AC grid). If the energy storage device 280 is used to power the solar collection system 100, it may be advantageous for the one or more controlled switches 214 and the one or more controlled switches 222 to all be deactivated (i.e., to be OFF).

Figure 2B:
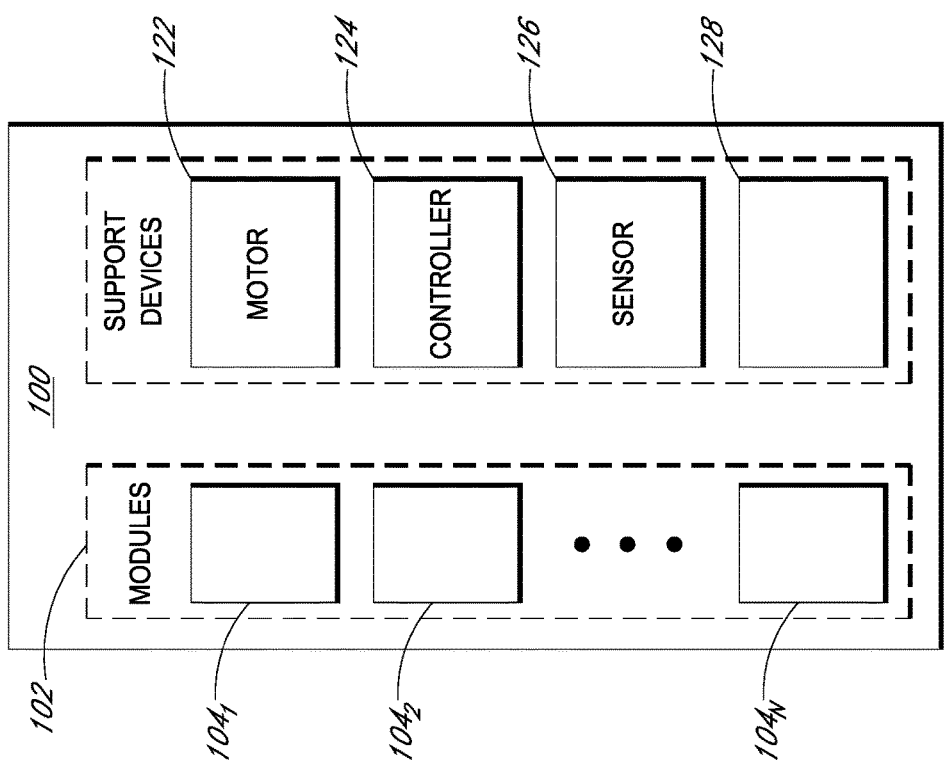
FIG. 2B is a block diagram showing some of the components of the solar collector system of FIG. 1.
Figure 2I:
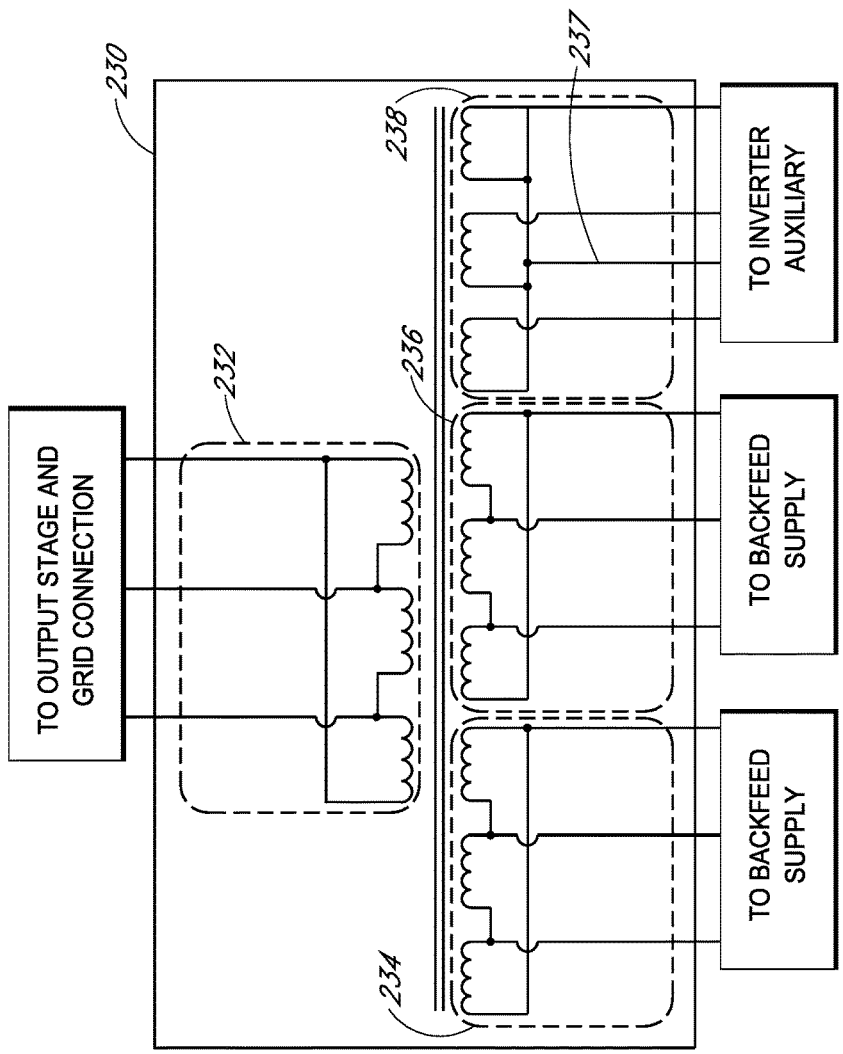
FIG. 2I is a circuit diagram of a transformer in accordance with various disclosed embodiments.
Figure 2H:
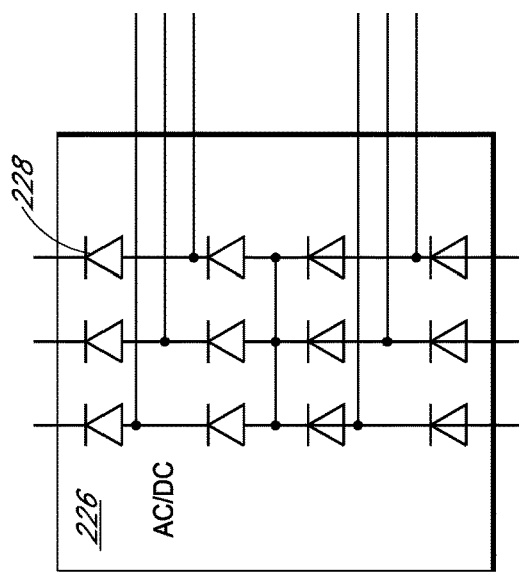
FIG. 2H is a circuit diagram of an AC-DC converter in accordance with various disclosed embodiments.

Referring now to FIG. 2B, a block diagram representation of the solar collection system 100 is shown. As discussed herein and in connection to FIG. 1, the solar collection system 100 may include an array 102 including any number of modules 104 (e.g., modules 104$_1$-104$_N$) and one or more support devices (i.e., one or more motors 122, one or more controllers 124, one or more sensors 126, one or more other support devices 128). The one or more support devices may receive power from the grid connection 240 when the voltage across the solar collection system 100 is below a threshold value as discussed herein.

Referring now to FIG. 2C, an AC-DC converter 226 with a passive topology is shown. The passive AC-DC converter 226 may include three sets of two diodes 228. The six diodes 228 may be arranged to form a six pulse full wave bridge rectifier, which converts each of the phases of the three phase AC power flowing from the grid connection 240 into a DC waveform. The output of the passive AC-DC converter of FIG. 2C may be a repeating DC waveform with relatively substantial differences between the peaks and troughs of the DC waveform. It will be understood that in a one or two phase system, the AC-DC converter 226 may include one set or two sets of diodes 228, respectively.

Referring now to FIG. 2D, an AC-DC converter 226 with an active topology is shown. The active AC-DC converter 226 may include diodes 228 and control components 229 (e.g., transistors). The active AC-DC converter 226 may also include a capacitor 227. The six diodes 228 may be arranged to form a six pulse full wave bridge rectifier, and the two control components 229 (e.g., transistors) may be arranged in a half bridge topology. The control signals for the two control components 229 (e.g., transistors) may be generated by the inverter controller 212. The six pulse full wave bridge rectifier may convert each of the phases of the three phase AC power flowing from the grid connection 240 into a DC waveform. The DC output of the six diodes 228 may be stored by the capacitor 227, and the two control components 229 (e.g., transistors) may control the duty cycle of the AC-DC converter 226 to regulate the DC output of the AC-DC converter 226 of FIG. 2D. Accordingly, the AC-DC converter 226 of FIG. 2D may achieve a more even DC output relative to the AC-DC converter 226 of FIG. 2C and may be configured to adjust the output voltage of the AC-DC converter 226 to accommodate fluctuations in AC power received from the transformer 230. It will be understood that in a one or two phase system, the AC-DC converter 226 may include one set or two sets of diodes 228, respectively.

Referring now to FIG. 2E, a circuit diagram of a three winding embodiment of the transformer 230 is shown. The transformer 230 of FIG. 2E may include a first winding 232 coupled to the output stage 206 and the grid connection 240, a second winding 234 coupled to the backfeed power supply 220, and a third winding 236 coupled to the inverter auxiliary 210. In the transformer 230 of FIG. 2E, the first winding 232 is galvanically isolated from the second winding 234 and third winding 236. The transformer 230 of FIG. 2E may therefore convert the higher voltage AC power from the grid connection 240 into lower voltage AC power to power the backfeed power supply 220 and inverter auxiliary 210 without current passing directly from the grid connection 240 to the backfeed power supply 220 and the inverter auxiliary 210. Further, because the backfeed power supply 220 and inverter auxiliary 210 are coupled to their own respective windings 234 and 236, the backfeed power supply 220 and the inverter auxiliary 210 are also galvanically isolated. Additionally, the first winding 232 and the second winding 234 may include windings connected in a delta configuration while the third winding 236 may include windings connected in a wye configuration. Accordingly, the third winding 236 may include a neutral line 237 that allows the inverter auxiliary 210 to use two different voltage levels: line to line and line to neutral.

Referring now to FIG. 2F, a circuit diagram of a two winding embodiment of the transformer 230 is shown. The transformer 230 of FIG. 2E may include a first winding coupled to the output stage 206 and the grid connection 240 and a second winding 234 coupled to both the backfeed power supply 220 and the inverter auxiliary 210. In the transformer 230 of FIG. 2F, the first winding 232 is galvanically isolated from the second winding 234. The transformer 230 of FIG. 2F may therefore convert the higher voltage AC power from the grid connection 240 into lower voltage AC power to power the backfeed power supply 220 and inverter auxiliary 210 without current passing directly from the grid connection 240 to the backfeed power supply 220 and the inverter auxiliary 210. However, because the backfeed power supply 220 and the inverter auxiliary 210 are both coupled to the second winding 234, the backfeed power supply 220 and the inverter auxiliary 210 are not galvanically isolated. Additionally, the first winding 232 may include windings connected in a delta configuration while the second winding 234 may include windings connected in a wye configuration. Accordingly, the second winding 234 may include a neutral line 237 that allows the inverter auxiliary 210 to use two different voltage levels: line to line and line to neutral.

Referring now to FIG. 2G, a circuit diagram of a non-isolating embodiment of the transformer 230 is shown. Unlike the transformers 230 illustrated in FIGS. 2E and 2F, the transformer 230 of FIG. 2G does not galvanically isolate the backfeed power supply 220 and the inverter auxiliary 210 from the AC current flowing from the grid connection 240, nor is the backfeed power supply 220 galvanically isolated from the inverter auxiliary 210. Instead, the non-isolating transformer 230 of FIG. 2G includes inductors with center taps 231 for each of the three phase AC power lines coupled to the transformer 230. The output of the transformer 230 of FIG. 2G may be shared by both the backfeed power supply 220 and the inverter auxiliary 210.

Referring now to FIG. 2H, an alternative AC-DC converter 226 with a passive topology is shown. The passive AC-DC converter 226 of FIG. 2H may include three sets of four diodes 228. The twelve diodes 228 may be arranged to form a twelve pulse full wave bridge rectifier, which converts each of the phases of the three phase AC power flowing from the grid connection 240 into a DC waveform. The output of the passive AC-DC converter of FIG. 2H may be a repeating DC waveform. Compared with the six pulse full wave bridge rectifier of FIG. 2C, the output of the twelve pulse full wave bridge rectifier of FIG. 2H produces a smoother output waveform with less difference between the peaks and the troughs of the DC waveform. It will be understood that in a one or two phase system, the AC-DC converter 226 may include one set or two sets of diodes 228, respectively. Additionally, it will be understood that to implement a twelve pulse full wave bridge rectifier, the transformer 230 must include an additional winding that is coupled to the backfeed power supply.

Referring now to FIG. 2I, a circuit diagram of a four winding transformer 230 is shown. As discussed herein with reference to FIG. 2H, an inverter 201 with a twelve pulse full wave bridge rectifier as an AC-DC converter 226 must have a transformer with an additional winding outputting current to the AC-DC converter 226. The four winding transformer 230 of FIG. 2I may include a first winding 232 coupled to the output stage 206 and the grid connection 240, a second winding 234 coupled to the backfeed power supply 220, a third winding 236 coupled to backfeed power supply 220, and fourth winding 238 coupled to the inverter auxiliary 210. In the transformer 230 of FIG. 2I, the first winding 232 is galvanically isolated from the second winding 234, third winding 236, and fourth winding 238. The transformer 230 of FIG. 2I may therefore convert the higher voltage AC power from the grid connection 240 into lower voltage AC power to power the backfeed power supply 220 and inverter auxiliary 210 without current passing directly from the grid connection 240 to the backfeed power supply 220 and the inverter auxiliary 210. Further, because the backfeed power supply 220 and inverter auxiliary 210 are coupled to their own respective windings 234 and 238 and 236, the backfeed power supply 220 and the inverter auxiliary 210 are also galvanically isolated. Additionally, the first winding 232, the second winding 234, and the fourth winding 238 may include windings connected in a delta configuration while the third winding 236 may include windings connected in a wye configuration. Accordingly, the fourth winding 238 may include a neutral line 237 that allows the inverter auxiliary 210 to use two different voltage levels: line to line and line to neutral.

Figure 3:
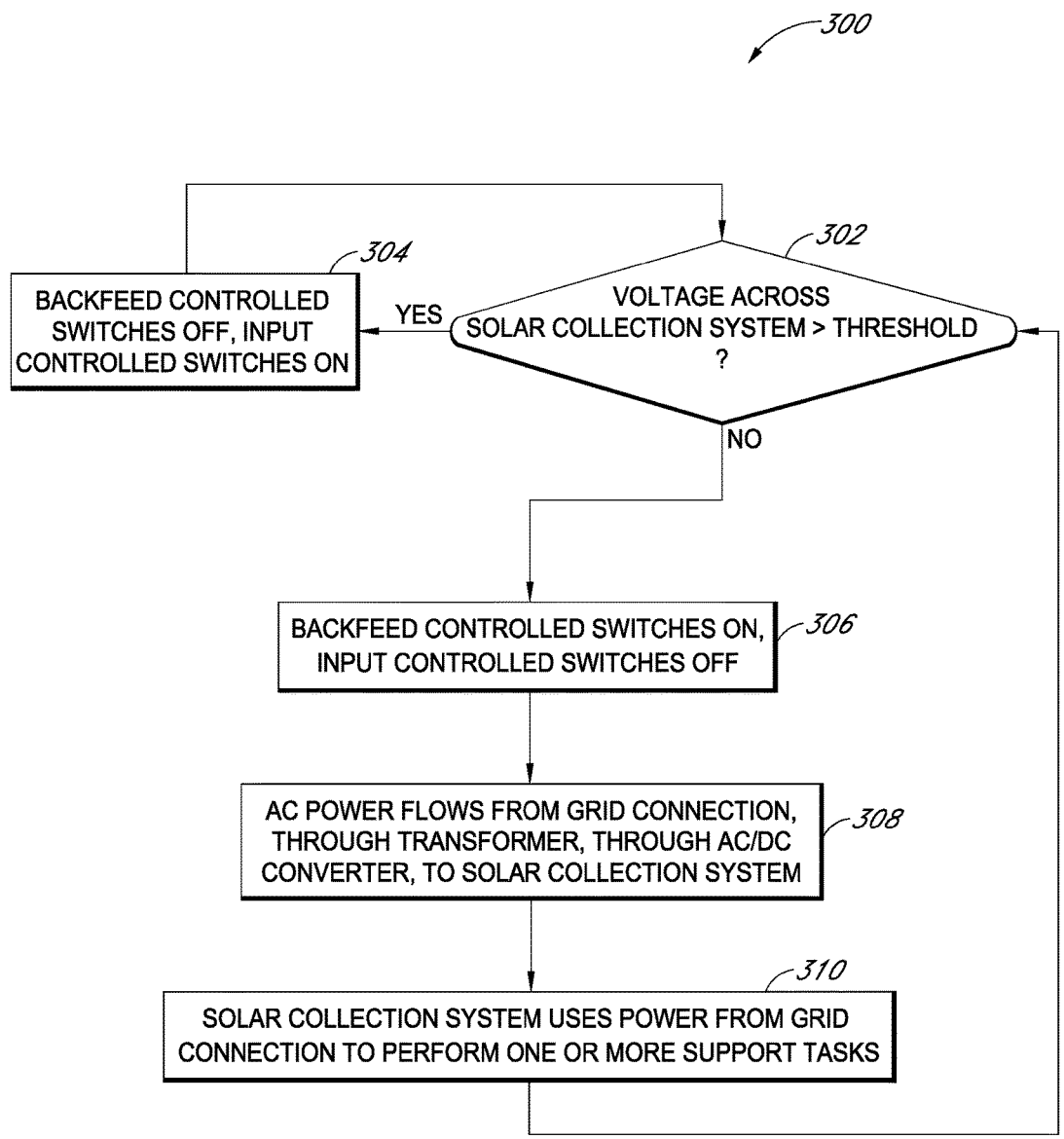
FIG. 3 is a flowchart illustrating an example backfeed connection control method in accordance with various disclosed embodiments.

Referring now to FIG. 3, a flowchart illustrating a backfeed connection control method 300 is shown. The backfeed connection control method 300 may be partially implemented by the one or more inverter controllers 212 and the backfeed power supply 220 of the inverter 201 and may be partially implemented by the solar collection system 100. At block 302, the inverter 201 measures (e.g., with a sensor outputting information to the one or more inverter controllers 212) the voltage across the solar collection system 100.

If the voltage across the solar collection system 100 is above a threshold level (e.g., 300 volts), the one or more controllers 212 output one or more commands to set the controlled switches 222 of the backfeed power supply 220 OFF and to set the one or more controlled switches 214 of the input stage 202 ON at block 304. During a time period (e.g., after sunrise and before sunset) when the controlled switches 222 of the backfeed power supply 220 are OFF and the one or more controlled switches 214 of the input stage 202 are ON, the backfeed power supply 220 does not supply power from the grid connection 240 to the solar collection system 100. It will be understood during this time period, the solar collection system 100 may provide power to the one or more support devices (e.g., one or more motors 122, one or more controllers 124, one or more sensors 126, one or more other support devices 128) to perform one or more support tasks (e.g., the support tasks discussed in reference to FIG. 4).

If the voltage across the solar collection system 100 is below the threshold level (e.g., 300 volts), the one or more controllers 212 output one or more commands to set the control switches 222 of the backfeed power supply 220 ON and to set the one or more controls which is 214 of the input stage 202 OFF at block 306. During a time period (e.g., between the time when the sun is low on the horizon before sunset and when the sun is low on the horizon after sunrise) when the controlled switches 222 of the backfeed power supply 220 are ON and the one or more controlled switches 214 of the input stage 202 are OFF, the backfeed power supply 220 supplies power from the grid connection 240 to the solar collection system 100 as discussed herein.

A "threshold level" of voltage is discussed herein. However, it will be understood that instead of a single threshold level (e.g., 300 volts), a plurality of threshold levels may be used. For example, the threshold level at which the one or more controllers 212 output one or more commands to set the controlled switches 222 of the backfeed power supply 220 OFF and to set the one or more controlled switches 214 of the input stage 202 ON at block 304 may be a first threshold level that is lower than a second threshold level (e.g., 280 volts). Conversely, the threshold level at which the one or more controllers 212 output one or more commands to set the control switches 222 of the backfeed power supply 220 ON and to set the one or more controls which is 214 of the input stage 202 OFF at block 306 may be the second threshold level (e.g., 320 volts) that is higher than the first threshold level. Additionally, it will be understood that the threshold level (or threshold levels) may be adjusted in the field (e.g., as a result of a command from the hub 260 over the network 250). Further, the threshold level (or threshold levels) may be dynamically adjusted over the course of a period of time (e.g., an hour, a day, a week, a month, etc.) to account for changing conditions.

With the control switches 222 of the backfeed power supply 220 closed and controlled switches 214 of the input stage 206 open, AC power flows from the grid connection 240 to the transformer 230 at block 308. The transformer 230 converts the AC power from the grid connection 240 to _V AC power. The _V AC power flows through the backfeed power supply 220 to the AC-DC converter 226. The AC-DC converter 226 converts the AC power to _volts DC power, which flows to the solar collection system 100. Upon receiving the _volts DC power, the solar collection system 100 may perform one or more support tasks at block 310. After the one or more support tasks are completed, the method 300 may loop back to block 302.

It will be understood that the voltage across the solar collection system 100 may be above the threshold value at a first time but when the solar collection system 100 attempts to perform one or more support tasks the voltage across the solar collection system 100 drops below the threshold at a second time. This may be because when current is shunted to the one or more support devices (i.e., one or more motors 122, one or more controllers 124, one or more sensors 126, one or more other support devices 128), the voltage across the solar collection system 100 may suddenly decrease as power is redirected to other parts of the solar collection system 100. In particular, this situation may occur shortly after sunrise (e.g., within 2 hours of sunrise), shortly before sunset (e.g., within 2 hours of sunset), or during a cloudy day.

For example, a solar collection system 100 may be generating power one hour before sunset when a decision is made to adjust the position of the solar collection system 100. As discussed herein, when the decision is made to adjust the position of the solar collection system 100, current may be shunted to one or more motors 122, one or more controllers 124, one or more sensors 126, and/or one or more other support devices 128 which may cause the voltage across the solar collection system 100 (as measured by the inverter 201) to drop below the threshold level (e.g., 300 volts). As discussed herein, power from the grid connection 240 may be used to power the one or more motors 122, one or more controllers 124, one or more sensors 126, and/or one or more other support devices 128 to perform the support task (i.e., adjusting the position of the solar collection system 100). Once the support task has been accomplished, the voltage across the solar collection system 100 may rise above the threshold value again. If the voltage across the solar collection system 100 exceeds the threshold value, the solar collection system 100 may resume generating power.

Figure 4:
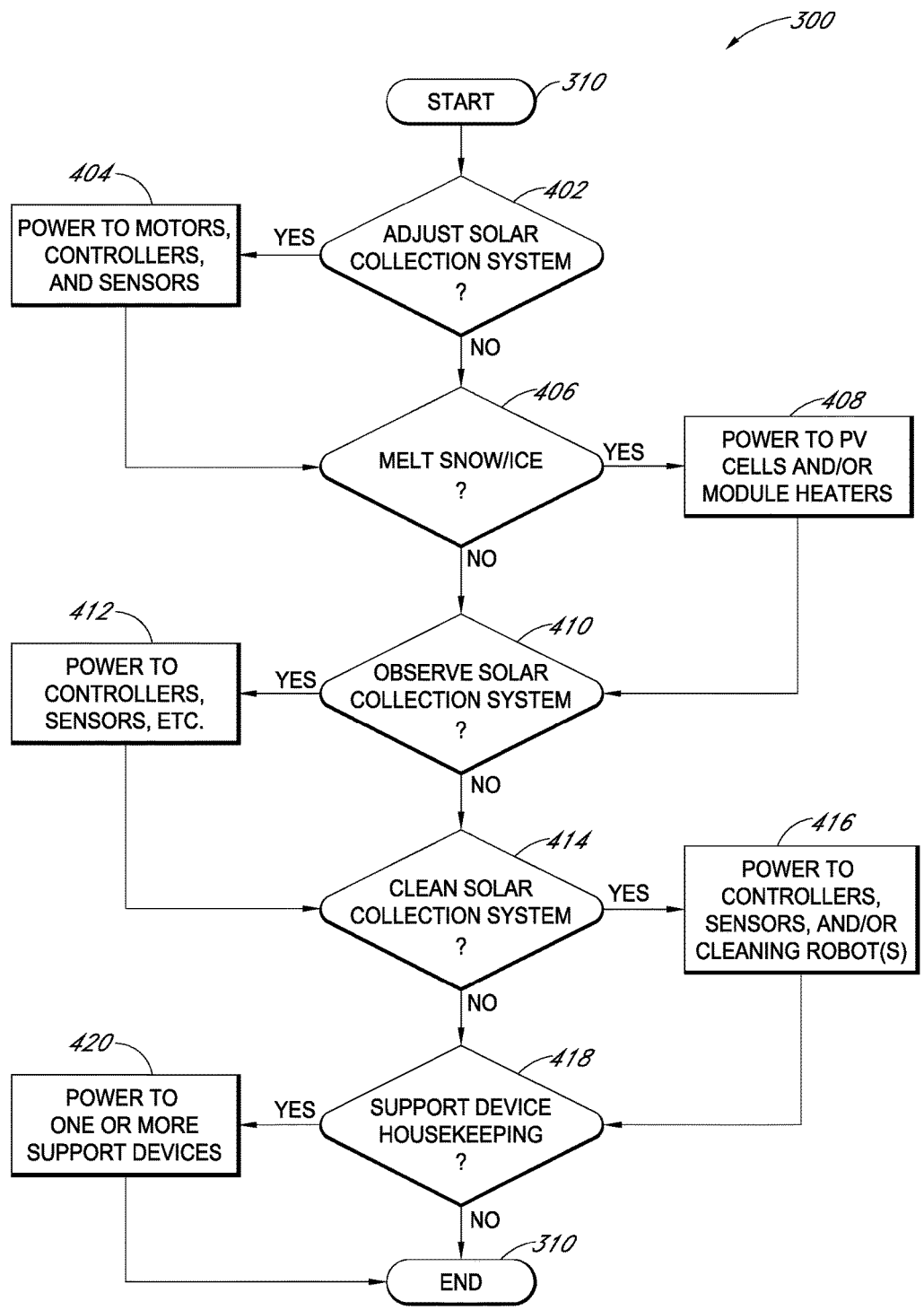
FIG. 4 is a flowchart illustrating example support tasks performed with the support devices of the solar collector system in accordance with various disclosed embodiments.

Preferring now to FIG. 4, a block diagram showing the one or more support tasks that the solar collection system 100 may perform using power flowing from the grid connection 240 at block 310 is shown. The tasks shown in FIG. 4 are non-limiting examples of support tasks, and it will be understood that the solar collection system 100 could perform one or more other support tasks using power flowing from the grid connection 240 that are not shown in FIG. 4. The process depicted in FIG. 4 may be implemented by the one or more motors 122, one or more controllers 124, one or more sensors 126, and/or one or more other support devices 128 of the solar collection system 100. Additionally, or alternatively, the hub 260 may issue commands to the solar collection system 100 to cause the solar collection system 100 (and its support devices) to perform some or all of the support tasks discussed herein. The commands issued by the hub 260 may be issued because the hub 260 received a command from one or more human technicians to issue the command. Additionally, or alternatively, the hub 260 may issue commands automatically because of software running on the hub 260.

At block 402, a decision is made whether to adjust the position of the solar collection system 100. The decision to adjust the position of the solar collection system 100 may be made by a human technician, the hub 260, and/or one or more controllers 124. The position of the solar collection system 100 may be adjusted for any of a number of reasons. For example, it may be advantageous to adjust the position of the solar collection system 100 to allow for maintenance of the solar collection system 100 (e.g., replacement of one or more modules 104, replacement of one or more motors 122, etc.). Additionally, or alternatively, it may be advantageous to adjust the position of the solar collection system 100 to position the solar collection system 100 for power generation the next morning (i.e., to adjust a west-facing solar collection system 100 after sunset to face the east to collect solar energy at the next sunrise). Further, it may be advantageous to adjust the position of the solar collection system 100 to reduce the amount of snow or ice that will accumulate on the solar collection system 100 during a snowstorm or to reduce the wind resistance of the solar collection system 100 during high winds. If the decision on whether to move the solar collection system 100 is affirmative, power from the grid connection 204 may flow to one or more motors 122, one or more controllers 124, one or more sensors 126, and/or one or more other support devices 128 of the solar collection system 100 while the position is being adjusted at block 404.

At block 406, a decision is made whether to melt snow or ice on the solar collection system 100. The decision to melt snow or ice on the solar collection system 100 may be made by a human technician, the hub 260, and/or one or more controllers 124. If the decision on whether to melt snow or ice on the solar collection system 100 is affirmative, power from the grid connection 240 may flow to one or more support devices 128 (e.g., heaters) and/or one or more modules 104 at block 408. By applying power to the one or more modules 104, the solar collecting devices 106 (e.g., PV cells) of the modules 104 may be reversed biased. It will be understood that when PV cells are reversed biased, the PV cell may generate heat. The heat generated by the heaters and/or reverse biased PV cells may be used to melt snow or ice deposited on the modules 104.

At block 410, a decision is made whether to observe the solar collection system 100. The decision to observe the solar collection system 100 may be made by a human technician, the hub 260, and/or one or more controllers 124. If the decision to observe the solar collection system 100 is affirmative, power from the grid connection 240 may flow to one or more controllers 124 (e.g., camera controllers, drone aircraft controllers), one or more sensors 126 (e.g., a camera, an infrared sensor, an ultraviolet sensor, etc.), and/or one or more other support devices 128 (e.g., one or more lights, one or more transmitters to communicate with a drone aircraft) of the solar collection system 100 while the solar collection system 100 is being observed at block 412.

At block 414, a decision is made whether to clean the solar collection system 100. The decision to clean the solar collection system 100 may be made by a human technician, the hub 260, and/or one or more controllers 124. If the decision to clean the solar collection system 100 is affirmative, power from the grid connection 240 may flow to one or more motors 122, one or more controllers 124 (e.g., cleaning robot controllers), one or more sensors 126, and/or one or more other support devices 128 (e.g., one or more lights, one or more cleaning robots) while the solar collection system 100 is being cleaned at block 416.

At block 414, a decision is made whether to perform housekeeping on the support devices of the solar collection system 100. The decision to perform housekeeping on the support devices of the solar collection system 100 may be made by a human technician, the hub 260, and/or one or more controllers 124. If the decision to perform housekeeping on the support devices of the solar collection system 100 is affirmative, power from the grid connection 240 may flow to one or more motors 122, one or more controllers 124, one or more sensors 126, and/or one or more other support devices 128 while housekeeping is performed on the support devices of the solar collection system 100 at block 420. "Housekeeping" may include any of a number of known maintenance tasks including but not limited to running diagnostics, calibration, updating firmware, etc. After blocks 418 and/or 420 are executed, the process loops back to block 302 as shown on FIG. 3.

Figure 5:
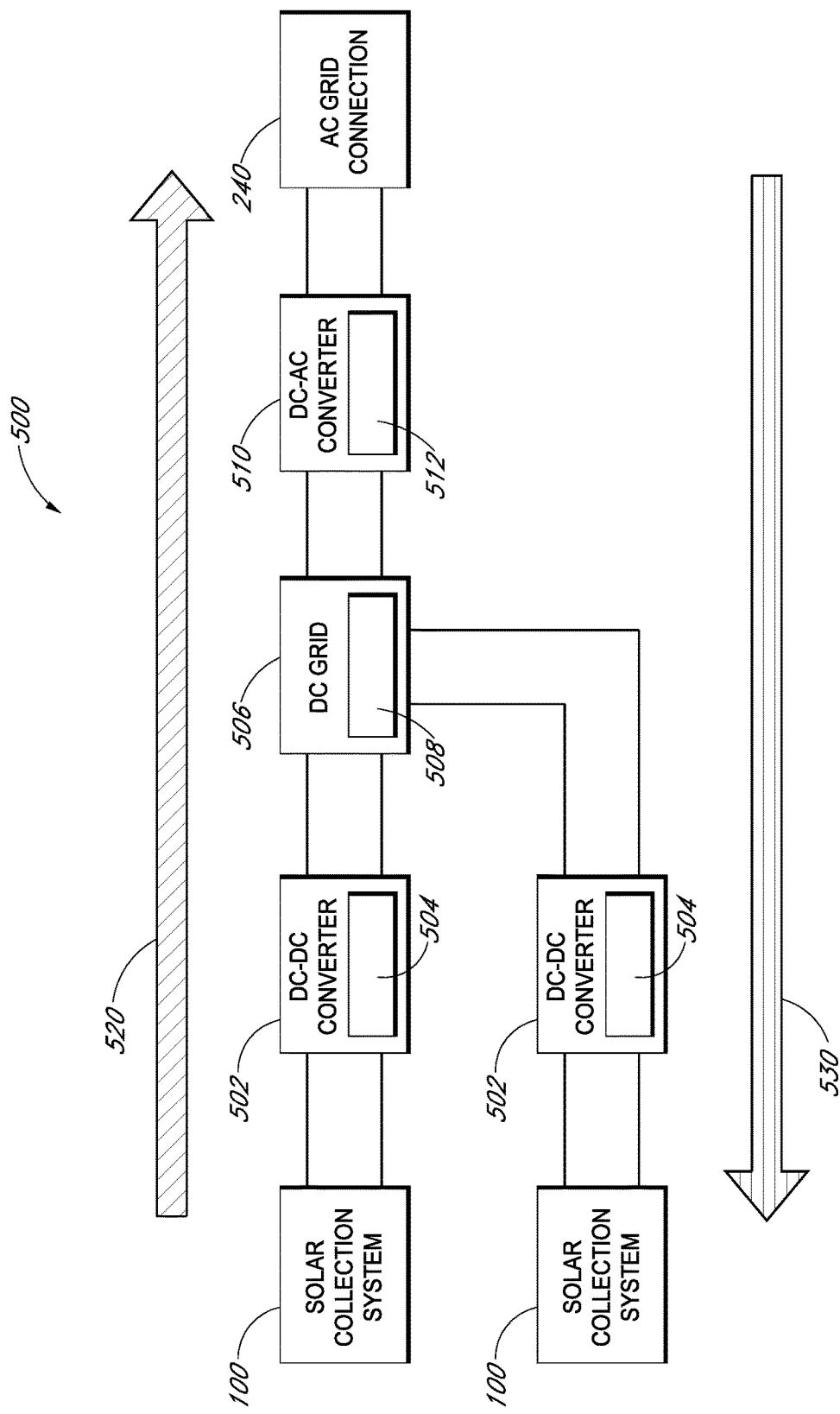
FIG. 5 is a block diagram of a solar power system in accordance with various disclosed embodiments.

Referring now to FIG. 5, a block diagram showing various components of a solar power system 500 is shown. In contrast to the DC to AC architecture of the solar power system 200, the solar power system 500 may use a DC to DC to AC architecture to deliver power generated by a solar collection system 100 to a regional power grid. This DC to DC to AC architecture of solar power system 500 may use a DC-DC converter 502 to transform the relatively low voltage generated by the solar collection system 100 (e.g., 300-1500 volts, although higher or lower voltages may be used) into relatively high voltage DC (e.g., 15,000 volts although higher or lower voltages may be used). This high voltage DC may be pushed to a high voltage DC grid 506, converted from high voltage DC power to AC power by a DC-AC converter 510, and pushed to the regional grid at a grid connection 240. Accordingly, the solar collection system 100 may generate power and push the power to the regional power grid by flowing current in a first direction 520 through the DC-DC converter 502, through the DC grid 506, through the DC-AC converter 510, and to the grid connection 240. As discussed herein, when the voltage across the solar collection system 100 is below a threshold value, however (e.g., 300 volts), the current through the power system 200 may be reversed and flow in a second direction 530: from the grid connection 240, through the DC-AC converter 510, through the DC grid 506, through the DC-DC converter 502, and to the solar collection system 100 (e.g., to perform one or more support tasks as discussed herein). While not shown in FIG. 5, the solar power system 500 may also include a network 250 coupled to some or all of the components shown in FIG. 5 and/or a hub 260 coupled to the network 250.

The solar power system 500 may include a DC-DC converter 502. The DC-DC converter 502 may include one or more control circuits 504. The one or more control circuits 504 may include a controller (e.g., a microcontroller, a microprocessor, etc.) configured to control the DC-DC converter 502 and implement various functions of the DC-DC converter 502. A first function of the DC-DC converter 502 is to convert the relatively low voltage DC power (e.g., 300-1500 volts, although higher or lower voltages may be used) to relatively high voltage DC power (e.g., 15,000 volts, although higher or lower voltages may be used) using known techniques (e.g., using a DC transformer) as current flows in the first direction 520. A second function of the DC-DC converter 502 may be to control (or help the controllers 124 control) the solar collection system 100 to implement known optimization techniques such as maximum power point tracking ("MPPT"). A third function of the DC-DC converter 502 may be to allow current to flow in the second direction 530, receive relatively high DC power from the DC grid 506, convert the relatively high voltage DC power to relatively low DC power, and deliver the relatively low DC power to the solar collection system 100.

The DC grid 506 may be a high-voltage DC power grid constructed using known techniques to receive the relatively high voltage DC power output by one or more DC-DC converters 502. The DC grid 506 may comprise high voltage DC cabling. The DC grid 506 may also comprise a DC grid control circuit 508. The DC grid control circuit 508 may include a controller (e.g., a microcontroller, a microprocessor, etc.), sensors, and or communications devices (e.g., transmitters, receivers, transceivers, etc.) configured to monitor the DC grid 506 and/or communicate with other devices connected to the DC grid 506 using known techniques (e.g., PLC). Current may flow through the DC grid in either direction (i.e., from the DC-DC converter 502 to the AC-DC converter 510, from the AC-DC converter 510 to the DC-DC converter 502). It will be understood that the DC-DC grid 506 may receive current from a first DC-DC converter 502, push current to a second DC-DC converter 502, and/or also push current to an AC-DC converter 510. Accordingly, a first solar collection system 100 may generate DC power that flows through a first DC-DC converter 502, onto the DC grid 506, through a second DC-DC converter 502, and to a second solar collection system 100.

The DC-AC converter 510 may comprise any known two-way DC-AC conversion topologies (e.g., an inverter and a rectifier). The DC-AC converter 510 may comprise an inverter 201 with a backfeed power supply 220 discussed herein. The DC-AC converter 510 may include a control circuit 512 comprising a controller (e.g., a microcontroller, a microprocessor, etc.) configured to control the DC-AC converter 510 and implement the functions of the DC-AC converter 510. The control circuit 512 may comprise an inverter controller 212 discussed herein. A first function of the DC-AC converter 510 may be to receive high voltage DC power from the DC grid 506, convert the high voltage DC power to AC power (e.g., using an inverter), and push the AC power to the grid connection 240. A second function of the DC-AC converter 510 may be to receive AC power from the grid connection 240, convert the AC power to DC power (e.g., using a DC-AC converter 226), and push the DC power to the DC grid 506.

It will be understood that as an alternative to the DC to DC to AC architecture discussed herein, the solar power system 500 may use a DC to DC architecture. Accordingly, a solar power system 500 with a DC to DC architecture may include one or more solar collection systems 100, one or more DC-DC converters 502, and a DC grid 506 but not include a DC-AC converter 510 or a grid connection 240 as shown in FIG. 5. The DC grid 506 may or may not be connected to a regional DC power grid.

Figure 6:
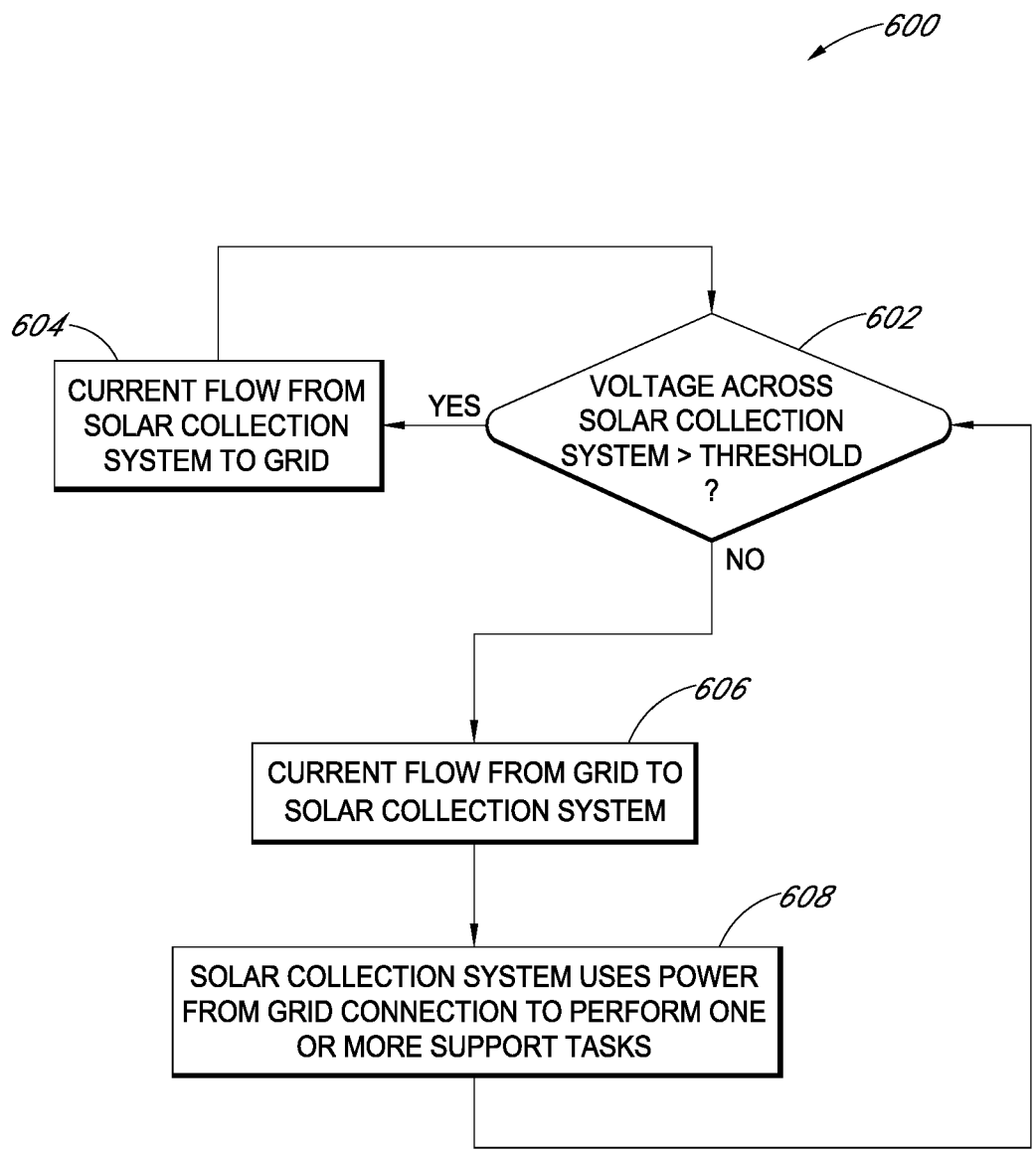
FIG. 6 is a flowchart illustrating an example backfeed connection control method in accordance with various disclosed embodiments.

Referring now to FIG. 6, a flowchart illustrating a backfeed connection control method 600 is shown. The backfeed connection control method 600 may be implemented by the solar power system 500. At block 602, the DC-DC converter 502 measures (e.g., with a sensor) the voltage across the solar collection system 100.

If the voltage across the solar collection system 100 is above a threshold level (e.g., 300 volts), current flows in a first direction 520 from the solar collection system 100 to the DC-DC converter 502 and to the DC grid 506 at block 604. The current flows in the first direction 520 during a first time period (e.g., after sunrise and before sunset). It will be understood during this first time period, the solar collection system 100 may provide power to the one or more support devices (e.g., one or more motors 122, one or more controllers 124, one or more sensors 126, one or more other support devices 128) to perform one or more support tasks (e.g., the support tasks discussed in reference to FIG. 4).

If the voltage across the solar collection system 100 is below the threshold level (e.g., 300 volts), current flows in a second direction 530 from the DC grid 506 to the DC-DC converter 502 and to the solar collection system 100 at block 606. The current flows in the second direction 530 during a second time period (e.g., between the time when the sun is low on the horizon before sunset and when the sun is low on the horizon after sunrise). It will be understood that the current flowing in the second direction 530 may come from the grid connection 240 (e.g., flowing from the grid connection 240, through the DC-AC converter 510, through the DC grid 506, through the DC-DC converter 502, and to the solar collection system 100) or from a second solar collection system 100 (e.g., flowing from the second solar collection system 100, through a second DC-DC converter 502, through the DC grid 506, through a first DC-DC converter 502, and to a first solar collection system 100). Alternatively, the DC grid 506 may be connected to a regional DC grid, and in such an embodiment the current flowing in the second direction 530 may come from a regional DC power grid.

A "threshold level" of voltage is discussed herein. However, it will be understood that instead of a single threshold level (e.g., 300 volts), a plurality of threshold levels may be used. For example, the threshold level used to determine whether current should flow in the first direction 520 may be a first threshold level that is lower than a second threshold level (e.g., 280 volts). Conversely, the threshold level used to determine whether current should flow in the second direction 530 may be the second threshold level (e.g., 320 volts) that is higher than the first threshold level. Additionally, it will be understood that the threshold level (or threshold levels) may be adjusted in the field. Further, the threshold level (or threshold levels) may be dynamically adjusted over the course of a period of time (e.g., an hour, a day, a week, a month, etc.) to account for changing conditions. When current flows in the second direction, the solar collection system 100 may perform one or more support tasks at block 608 (see e.g., the support tasks discussed in connection to FIG. 4). After the one or more support tasks are completed, the method 600 may loop back to block 602.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A solar power system coupled to an AC power grid comprising:
    a solar collection system;
    an inverter having an input terminal coupled to the solar collection system and an output terminal coupled to the AC power grid;
    a backfeed power supply coupled to the solar collection system and the input terminal of the inverter wherein the backfeed power supply is configured to not provide power from the AC power grid to the solar collection system during a first time period and to provide power from the AC power grid to the solar collection system during a second time period.

2. The solar power system of claim 1 wherein the solar collection system includes one or more support devices wherein the one or more support devices are adapted to use power generated by the solar collection system to perform one or more support tasks during the first time period and to use power from the AC power grid to perform one or more support tasks during the second time period.

3. The solar power system of claim 2 wherein the one or more support tasks include one or more of:
    adjusting a position of the solar collection system;
    melting snow or ice on the solar collection system;
    observing the solar collection system;
    cleaning the solar collection system;
    performing housekeeping on the one or more support devices.

4. The solar power system of claim 1 wherein the inverter includes an output stage and a transformer, wherein a first winding of the transformer is coupled to the output terminal, and a second winding of the transformer is coupled to the backfeed power supply.

5. The solar power system of claim 1 wherein the backfeed power supply includes one or more backfeed controlled switches and an AC-DC converter.

6. The solar power system of claim 5 wherein the inverter includes:
    one or more input controlled switches coupled to the solar collection system, and
    an inverter controller adapted to:
        activate the one or more input controlled switches and deactivate the one or more backfeed controlled switches during the first time period, and
        deactivate the one or more input controlled switches and activate the one or more backfeed controlled switches during the second time period.

7. The solar power system of claim 1 wherein the solar power system further comprises an energy storage device.

8. The solar power system of claim 1 wherein a DC voltage across the solar collection system is above a threshold value during the first time period and the DC voltage across the solar collection system is below a threshold value during the second time period.

9. A method for operating a solar power system including a solar collection system and coupled to a power grid, the method comprising:
    measuring a DC voltage of the solar collection system,
    determining whether the DC voltage is below a threshold value;
    when the DC voltage is below the threshold, providing power from the power grid to the solar collection system; and
    when the DC voltage is above the threshold, not providing power from the power grid to the solar collection system.

10. The method of claim 9 further comprising:
    using the power provided from the power grid to the solar collection system to perform one or more support tasks for the solar collection system.

11. The method of claim 10 wherein the one or more support tasks include one or more of:
    adjusting a position of the solar collection system;
    melting snow or ice on the solar collection system;
    observing the solar collection system;
    cleaning the solar collection system;
    performing housekeeping on one or more support devices of the solar collection system.

12. The method of claim 9 wherein providing power from the power grid to the solar collection system includes using a backfeed power supply to convert the power from the power grid from AC power to DC power.

13. The method of claim 12 wherein using a backfeed power supply to convert the power from the power grid from AC power to DC power includes activating one or more backfeed controlled switches to allow current flow through the backfeed power supply.

14. The method of claim 9 wherein providing power from the power grid to the solar collection system includes:
    activating one or more backfeed controlled switches in a backfeed power supply to enable current to flow from the power grid through the backfeed power supply to the solar collection system, and
    deactivating one or more input controlled switches in an inverter to prevent current from flowing from the solar collection system through the inverter to the power grid.

15. The method of claim 9 wherein providing power from the power grid to the solar collection system includes reversing a current through a DC-DC converter from a first direction to a second direction.

16. The method of claim 9 wherein providing power from the power grid to the solar collection system includes transmitting data encoded on the waveform of the power from the power grid.

17. A solar power system coupled to an AC power grid comprising:
- a solar collection system adapted to output DC power at a DC voltage;
- an inverter having an input terminal coupled to the solar collection system and an output terminal coupled to the AC power grid, the inverter including:
  - one or more input controlled switches,
  - an output stage,
  - an inverter controller,
  - a transformer having a first winding coupled to the output terminal and a second winding;
- a backfeed power supply coupled to the solar collection system, the input terminal, and the second winding of the transformer, the backfeed power supply including:
  - an AC-DC converter, and
  - one or more backfeed controlled switches;
- wherein the inverter controller is adapted to:
  - receive the DC voltage,
  - determine whether the DC voltage is below a threshold value,
  - if the DC voltage is below the threshold value, deactivate the one or more input controlled switches and activate the one or more backfeed controlled switches, and
  - if the DC voltage is above the threshold value, activate the one or more input controlled switches and deactivate the backfeed controlled switches,
- wherein the solar collection system receives power from the AC power grid when the one or more backfeed controlled switches are activated.

18. The solar power system of claim 17 wherein the solar collection system includes one or more support devices adapted to perform one or more support tasks using the power received from the AC power grid when the one or more backfeed controlled switches is activated.

19. The solar power system of claim 18 wherein the one or more support tasks include one or more of:
- adjusting a position of the solar collection system;
- melting snow or ice on the solar collection system;
- observing the solar collection system;
- cleaning the solar collection system;
- performing housekeeping on the one or more support devices.

20. The solar power system of claim 17 further comprising an energy storage device.

* * * * *